Nov. 20, 1934.  W. G. GREEN  1,981,266
VIBRATING GALVANOMETER
Filed Nov. 10, 1932  2 Sheets-Sheet 1
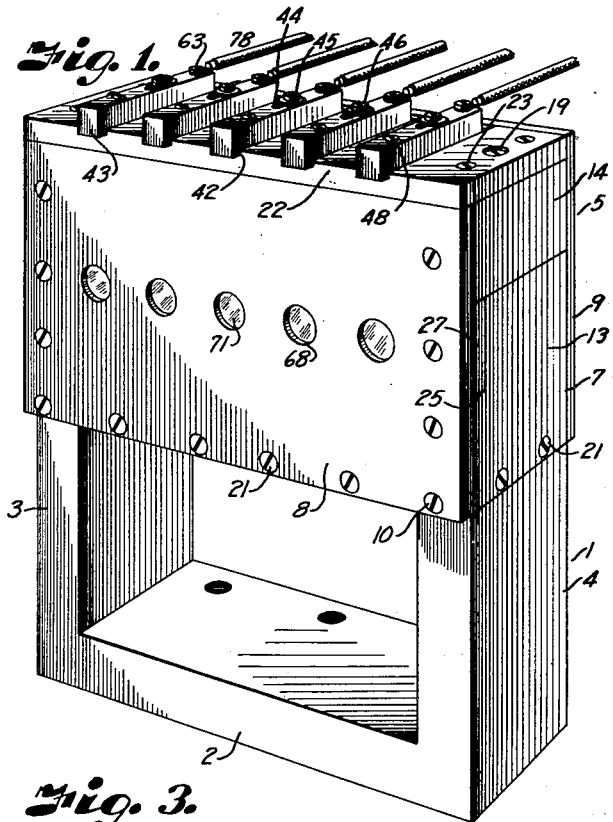
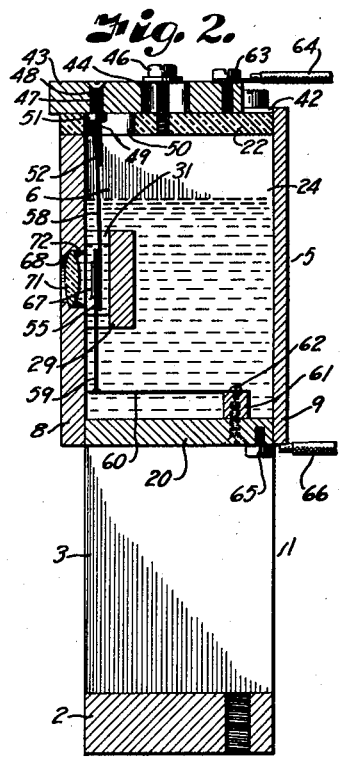
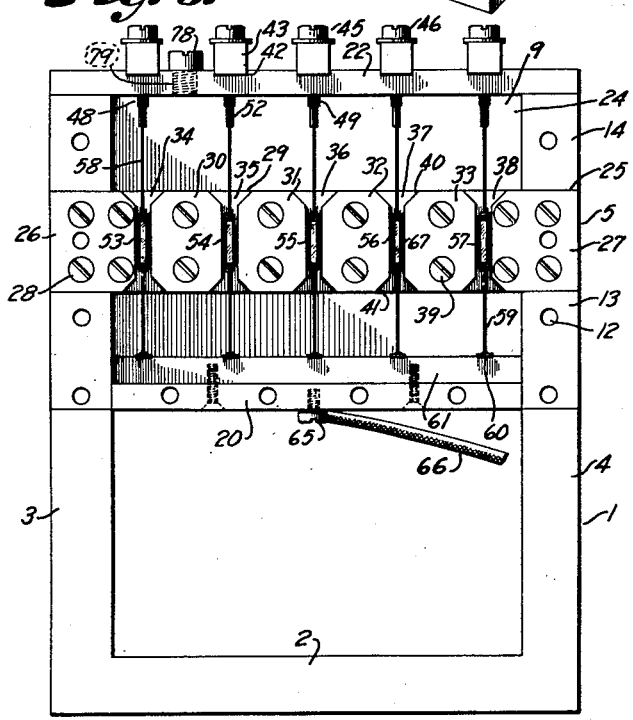
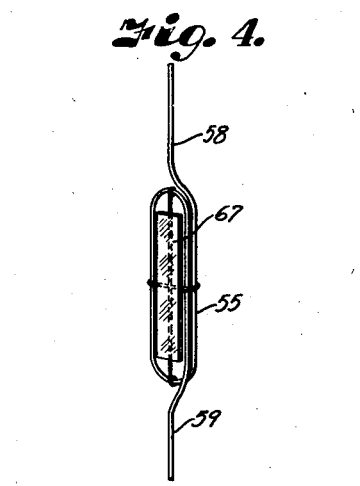
INVENTOR
William G. Green.
BY
Arthur C. Brown
ATTORNEY Nov. 20, 1934.  W. G. GREEN  1,981,266

VIBRATING GALVANOMETER

Filed Nov. 10, 1932  2 Sheets-Sheet 2

INVENTOR
William G. Green.
BY
Arthur C. Brown
ATTORNEY

Patented Nov. 20, 1934

1,981,266

UNITED STATES PATENT OFFICE 1,981,266

VIBRATING GALVANOMETER

William G. Green, Tulsa, Okla.

Application November 10, 1932, Serial No. 641,994

6 Claims. (Cl. 171—95)

My invention relates to an oscillographic apparatus and more particularly to a vibrating galvanometer for visibly recording or measuring the fluctuations of electric currents, and has for its principle object to provide a simple compact and rugged multiple galvanometer of the coil type wherein all the vibrating elements are exactly the same, located in the same magnetic fields and subjected to the same temperature changes.

Other objects of the invention are to provide for simultaneous access to all of the vibrating elements, to provide a larger damping mass for the entire galvanometer and to provide a construction whereby the effects of outside extraneous mechanical vibrations are minimized.

In accomplishing these and other objects of the invention, I have provided improved details of structure, the preferred forms of which are illustrated in the accompanying drawings, wherein:—

Fig. 1 is a perspective view of a vibrating galvanometer constructed in accordance with my invention.

Fig. 2 is a vertical cross sectional view through the galvanometer illustrating the method of suspending the vibrating coils and the casing for containing an insulating fluid to damp movements of the coils.

Fig. 3 is a front elevational view of the galvanometer with the front plate of the case removed to better illustrate the vibrating coils and their related magnetic fields.

Fig. 4 is an enlarged detail perspective view of one of the vibrating coils and its mirror for reflecting a beam of light to visibly record oscillations of the coil upon a screen or sensitized film.

Figure 5:
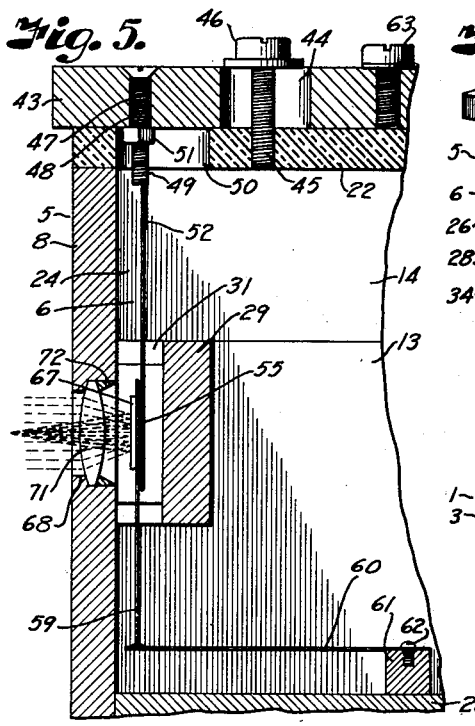
Fig. 5 is an enlarged, vertical, sectional view through the front portion of the galvanometer casing illustrating the reflection of light through concentrating lenses.

Referring more in detail to the drawings:

1 designates a substantially U-shaped magnet including a base portion 2 integrally connecting the lower ends of vertically arranged poles 3 and 4 which form supports for a galvanometer casing 5 having the same length and width as the magnet base portion. The casing includes side walls 6 and 7 and front and rear walls 8 and 9 which are secured together by screws 10 extending through openings 11 in the front and rear walls and into threaded sockets 12 formed in the end walls.

The end walls 5 and 6 preferably comprise lower magnetic blocks 13 forming upward extensions on the pole pieces 3 and 4 and nonmagnetic blocks 14 supported on the upper edges of the magnetic blocks to form a casing of the required depth.

Figure 6:
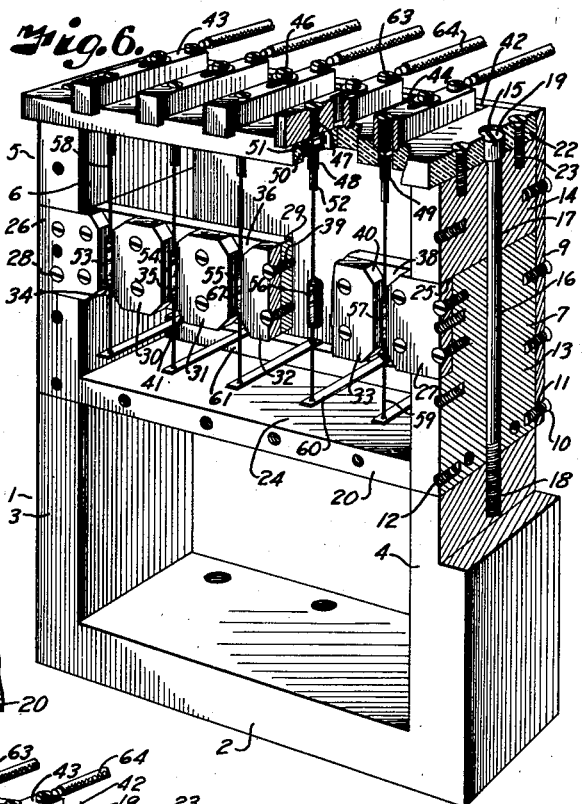
Fig. 6 is a perspective view of the galvanometer with the front plate removed and part of the side wall of the casing broken away to show its construction and the method of attaching the casing to the magnet and showing a part of the pole piece supporting bar broken away to illustrate attachment of the inner pole pieces.

The blocks 13 and 14 are retained in abutting relation with each other by the front and rear plates 8 and 9 and the casing is retained on the upper faces of the magnet poles 3 and 4 by threaded rods 15 extending through aligning opening 16 and 17 in the blocks 13 and 14 and into threaded sockets 18 formed in the upper faces of the pole pieces as best illustrated in Fig. 6. The upper ends of the rods 15 are provided with heads 19 for engaging against the upper face of the blocks 14 to additionally clamp the blocks together and the magnetic blocks of the casing in intimate contact with the poles of the magnet.

The magnetic force of the blocks 13 is strengthened by the induced magnetism of the magnet and the blocks constitute outer magnetic poles for inducing magnetism in a series of pole pieces later described. The bottom of the casing is closed by a non-magnetic metal plate 20 which is secured to the end walls 6 and 7 and to the front and rear plates by fastening devices 21 similar to the fastening devices 10 previously described.

The top of the casing is closed by a plate 22 formed of insulating material of sufficient size to overlap the front and end walls and to engage against the extended upper edge of the rear wall, the plate being secured by fastening devices 23 extending therethrough and into threaded sockets formed in the upper edge of the blocks 14 as best illustrated in Fig. 6.

The casing thus described forms a closed, substantially rectangular chamber 24 for containing the pole pieces, the vibrating elements, and a fluid for damping movement of the vibrating elements.

The upper front edges of the blocks 13 are recessed, as at 25, to form a shoulder support for end pole pieces 26 and 27 comprising substantially rectangular-shaped plates of sufficient width to project within the chamber 24 as best illustrated in Figs. 3 and 6. The pole pieces 26 and 27 are securely anchored in the recesses 25 by fastening devices 28 extending through openings in the pole pieces and into threaded openings in the magnet blocks 13 and when assembled form a part of the magnet.

Fixed to the inner faces of the projecting ends of the pole pieces 26 and 27 is a bar 29 extending across the width of the chamber 24 and formed of non-magnetic material for supporting a series of spaced inner pole pieces 30, 31, 32 and 33 in the plane of the outer pole pieces 26 and 27, the inner pole pieces being spaced from the outer pole pieces and from each other to provide air gaps or magnetic fields 34, 35, 36, 37 and 38 (Fig. 3). The inside pole pieces are thus arranged in series and have induced poles uniformly magnetized so that the magnetic fields set up therebetween are all equal. The inner pole pieces are secured to the front face of the bar 29 by screws 39 extending through openings in the pole pieces and through threaded openings in the bar as illustrated in Fig. 6. The corners of the pole pieces are also preferably bevelled as at 40 and 41.

Formed in the upper face of the insulated plate 22 directly above each of the air gaps are transverse grooves 42 forming tracks for slidingly movable bars 43. The bars 43 are of sufficient size to be snugly received in their respective tracks and have slightly less length than the width of the plate 22 so that they can be shifted thereacross without their ends projecting a very great distance from the forward edge of the plate when the bars are shifted to their most forward position. The center portions of the bars are provided with longitudinal slots 44 through which screws 45 are extended to clamp the bars to the plate 22, the screws being provided with shouldered heads 46 for engaging against the upper faces of the bars to clamp the bars in adjusted position in the grooves.

The lengths of the slots 44 are sufficiently long to permit the required maximum adjustment of the bars. The forward ends of the bars are provided with openings 47 for supporting screws 48 having depending ends 49 extending through slotted openings 50 formed in the plate 22 at the forward ends of the grooves 42 as best illustrated in Fig. 2. The screws are normally retained against rotation in the bars 43 by nuts 51 threaded on the depending ends of the screws and engaging the under faces of the bars.

Depending from the lower ends of the screws are tongues 52, and suspended therefrom are relatively small coils 53, 54, 55, 56 and 57 which are movable in the respective air gaps 34, 35, 36, 37 and 38 under influence of currents flowing through the coils. The coils are suspended from the tongues by relatively delicate alloy ribbons 58 having their upper ends secured to the tongues and their lower ends conductively secured to the respective coils as illustrated in Fig. 3.

In order to complete circuits through the coils and to retain them in taut position in the vertical axial center of their fields, the lower sides of the coils are conductively connected with similar ribbons 59 having their lower ends attached to the projecting ends of flat springs 60.

The springs 60 have their rear ends fixed to a metal bar 61 extending across the width of the compartment 24 and secured to the upper face of the bottom plate 20 (Fig. 2), the springs being secured to the bar by screws 62.

To conduct electric currents which are to be measured to the coils, the rear end of each of the bars 43 is provided with a screw 63 to secure electrical conductors 64 which are in turn connected to the source of the currents and the bar 61 is provided with a similar screw 65 to which a return conductor 66 is connected for completing the circuit.

Fixed to each of the coils is a mirror 67 for reflecting light rays through openings 68 provided in the front plate 8 directly in alignment with each of the coils, the openings being closed by concentrating lenses 71 which are sealed therein by an oil-proof cement as indicated at 72 (Fig. 2) to retain the damping liquid. It is obvious that the lenses concentrate light reflected by the mirrors and that the concentrated light rays may be directed onto a screen or sensitized film (not shown) as in ordinary practice in oscillographic apparatus.

Figure 7:
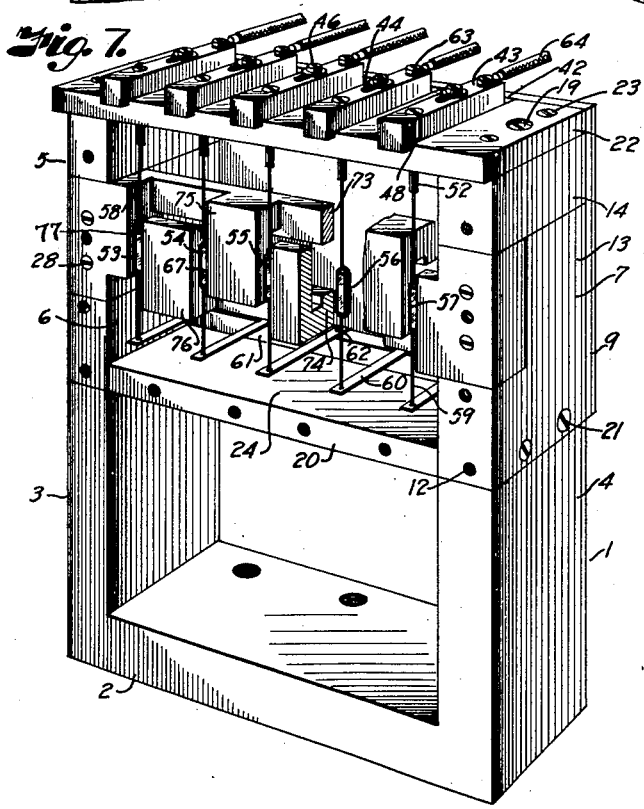
Fig. 7 is a perspective view of a galvanometer constructed in accordance with my invention and showing a modified arrangement of the pole pieces.
Figure 8:
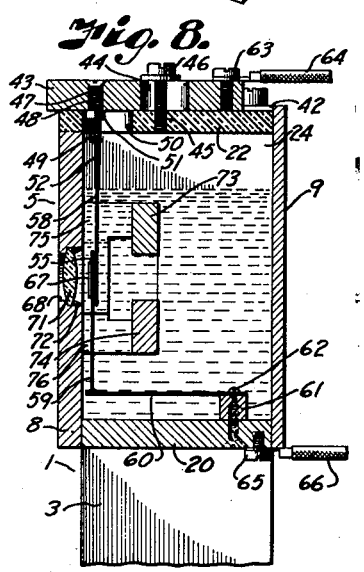
Fig. 8 is a vertical, sectional view through the galvanometer case illustrated in Fig. 7.

In Figs. 7 and 8 is illustrated a modified form of pole piece arrangement wherein the upper ends of poles of the U-shaped magnet 2 are provided with laterally extending and vertically spaced bars 73 and 74 which extend longitudinally of the compartment but terminate short of the opposite ends thereof to form N and S pole supports for a series of inner pole pieces 75 and 76, the pole pieces being preferably formed integrally with the bars and arranged thereon so that the pole pieces 75 project downwardly and the pole pieces 76 extend upwardly in staggered spaced relation to form air gaps 77 therebetween complementary to the air gaps in the form of magnet illustrated in Figs. 1 to 6. In this arrangement the pole pieces are mounted in parallel and are directly magnetized. This construction is particularly desirable where more than five coils are mounted in a single casing for use where it is desired to measure more than five electric currents at one time. Otherwise the construction is identical to that illustrated in the preferred form.

In operating a vibrating galvanometer constructed and assembled as described, the casing is filled with a transparent insulating liquid through a port 78 which is closed by a plug 79. The screws 48 are then rotated to move the mirrors in parallel relation with the lenses when no current is flowing through the coils.

The screws 45 are then loosened and the bars are shifted longitudinally of their tracks to shift the coils in their respective air gaps so that the mirrors carried thereby reflect light in the proper direction. The screws 45 are then retightened to retain the bars in adjusted position. The conductors 64 leading from the source of current to be measured are then connected to their respective bars and the common conductor 65 is connected to the ground connection 66. The currents to be measured then pass through the respective conductors 64, bars 43, suspension ribbons 58, vibratory coils, tensioning ribbons 59, springs 60, bars 61 and conductor 66. Fluctuation of the current flowing through the coils or alternating currents cause the coils to change polarity and the change of polarity of the coils relatively to the poles in the magnetic fields in which the coils are associated cause the coils to vibrate or swing on their supporting ribbons in synchronism with the fluctuations of the currents.

Light shining through the lenses will be reflected back by the mirrors in concentrated beams to fall on a photographic film as in ordinary oscillographic apparatus to visibly record the fluctuations of the current in the form of sinusoidal curves on the film. The transparent liquid in the case damps the vibratory movement of the coils to prevent their natural frequencies from altering the correct recording of the current fluctuations.

From the foregoing it is apparent that I have provided a vibrating galvanometer wherein all of the coils are alike and equally tensioned in their respective fields and due to the fact that they are supported in a common body of damping liquid they are all subject to the same temperature changes and atmospheric conditions. Also due to the spring tensioning of the coils all of the coils have substantially the same natural frequencies so that accurate recording of the current fluctuations is obtained.

What I claim and desire to secure by Letters Patent is:

1. A device of the character described including a casing, magnetic pole pieces, means for supporting the pole pieces within the casing in spaced relation to each other to form a series of air gaps, a coil associated with each air gap, means for suspending the coils for movement in said air gaps, an indicating element carried by each of the coils, means for passing electric currents to be measured through said coils to effect movement of the coils in response to the frequency of the currents flowing therethrough, and a single body of liquid in said casing surrounding the pole pieces and the coils for damping movements of the coils and maintaining the same temperature conditions around each of the coils.

2. A device of the character described including a casing, magnetic pole pieces, means for supporting the pole pieces within the casing in spaced relation to each other to form a series of air gaps, vibratory elements, means for supporting the vibratory elements for swinging movement in said air gaps, means on the vibratory elements for reflecting light rays, means slidably supported on the casing for shifting said vibratory elements to adjust the reflected light rays in a vertical direction, means for adjusting said elements for adjusting said rays in a horizontal direction, and damping means in said casing common to all of the vibratory elements for damping movements thereof and surrounding said last-named adjusting means for maintaining common temperature conditions whereby each vibratory element will have like natural frequencies.

3. A device of the character described including a casing, magnetic pole pieces, means for supporting the pole pieces within the casing in spaced relation to each other to form a series of air gaps, a coil associated with each air gap, flexible means for suspending the coils for movement in said air gaps, springs fixed to the casing, flexible means for connecting the springs with the coils, a mirror carried by each of the coils, means for passing electric currents to be measured through said coils to effect movement of the coils in response to the frequency of the current flowing therethrough, and a single body of liquid in the casing surrounding said coils and springs for damping movement of the coils and for maintaining temperature conditions around the respective coils and springs.

4. In a device of the character described, a magnet including a base portion and vertically positioned pole pieces at the ends of the base portion, a galvanometer casing supported on the pole pieces of the magnet and having spaced portions in magnetic relation with said pole pieces, a pair of end pole pieces fixed in the casing in magnetic relation with said portions of the casing, a series of spaced pole pieces within the casing between said end pole pieces to form a series of air gaps, vibratory elements, means for suspending the vibratory elements in said air gaps, and a body of liquid in the casing for damping the movement of said vibratory elements.

5. In a device of the character described, a magnet including a base portion and vertically positioned pole pieces at the ends of the base portion, a non-magnetic galvanometer casing having magnetic end portions supported on the upper ends of said pole pieces, spaced bar portions fixed to the magnetic portions of the casing, a series of spaced pole pieces mounted on said bar portions and arranged to form air gaps therebetween, a vibratory element in each air gap, means for conductively suspending the vibratory elements in the air gaps, and a body of liquid in the casing surrounding said vibratory elements for damping the movement thereof.

6. In a device of the character described, a galvanometer casing including top, bottom and side walls formed of non-magnetic material and having spaced grooves extending transversely of the top wall, and including end wall portions formed of magnetic material, a series of pole pieces supported in the casing in magnetic relation to form air gaps therebetween, contact bars adjustably supported in said grooves above said air gaps, flat springs fixed in the casing below said air gaps in alignment with said bars, a coil in each air gap, flexible means suspending the coils between the bars and said springs, and a single body of fluid in the casing surrounding said coils for damping movement of the coils and for maintaining the same temperature about each of the coils.

WILLIAM G. GREEN.